(12) United States Patent
Shen

(10) Patent No.: US 7,027,883 B2
(45) Date of Patent: Apr. 11, 2006

(54) TOOL RESERVE FOR SINGLE FABRICATION AND HOMOGENOUS MES

(75) Inventor: Mei-Yin Shen, Hsin chu (TW)

(73) Assignee: Taiwan Semiconductor Manufacturing Co., Ltd. (TW); .

(*) Notice: Subject to any disclaimer, the term of this patent is extended or adjusted under 35 U.S.C. 154(b) by 128 days.

(21) Appl. No.: 10/681,619

(22) Filed: Oct. 8, 2003

(65) Prior Publication Data
US 2005/0080501 A1 Apr. 14, 2005

(51) Int. Cl.
G06F 19/00 (2006.01)

(52) U.S. Cl. .............................. 700/96; 700/95; 700/121
(58) Field of Classification Search .................... 700/96, 700/95, 103, 108, 109, 121
See application file for complete search history.

(56) References Cited

U.S. PATENT DOCUMENTS 6,684,121 B1 * 1/2004 Lu et al. ...................... 700/108
6,766,208 B1 * 7/2004 Hsieh .......................... 700/109

* cited by examiner

Primary Examiner—Leo Picard
Assistant Examiner—Charles Kasenge
(74) Attorney, Agent, or Firm—Duane Morris LLP

(57) ABSTRACT

A system is disclosed for an integrated manufacturing execution system, MES, that unifies the production data for a manufactured lot that moves from a current production line to different production lines, and a process is disclosed for reserving tools by a unified MES that checks for manufacturing capacity utilization of the tools.

10 Claims, 2 Drawing Sheets

TOOL RESERVE FOR SINGLE FABRICATION AND HOMOGENOUS MES

FIELD OF THE INVENTION

The invention relates to an integrated, or homogenous, manufacturing execution system, MES, that unifies the production data for a manufactured lot that moves to different production lines existing with different MESs.

BACKGROUND OF THE INVENTION

A high volume production facility has multiple equipment capable of performing the same process step in different production lines. Then, manufacturing lots can move from a current production line into the queue of a different production line for performance of the next process step. In the event that a manufacturing lot is moved from a current production line to the queue of a different production line for the next process step, the event is referred to as, a manufacturing lot backup from current equipment to a different equipment.

Before backup would occur, factory personnel would perform a number of backup preparation steps. The process engineer for the current equipment would select suitable backup equipment and a pilot run in the backup equipment. The process engineer for the backup equipment would construct the formal equipment recipe and the process controls implemented by the MES of the backup equipment. The process integration engineer for the backup equipment would prepare routing data in the MES of the backup equipment. Thus, the lot data can be accessed by the MES of the backup equipment, and would keep production data for that lot. Then the backup plan was announced to engineers and technicians. The technicians for both current equipment and backup equipment communicate before the manufacturing lot moves to the backup equipment.

The backup preparation steps are arduous and complicated to perform. The flow of backup preparations is complex. Queue time controls were not available to reduce the time in queue for the next process step.

Each time a process step is performed by a different production line, the production data is kept by the MES of that different production line. Thus multiple MESs exist with the fabrication of the same manufacturing lot. Advanced process controls can not be established for such multiple MESs. Further, the multiple MESs are independent data sources, which makes it difficult to track the current location of a manufacturing lot during its manufacture.

It is not a practical solution to merge the different MESs of different production lines to a single MES that would be for all the different production lines.

SUMMARY OF THE INVENTION

The present invention simulates a single MES to exist with the fabrication of a manufacturing lot that would move among different production lines that exist with different MESs. Higher technology tools of the invention improves backup by reducing the backup time and tasks, and by having improved production data information.

The present invention relates to production data for a manufactured lot that moves from a current production line to a different production line for the next process step. According to an embodiment of the invention a central database stores a lot ID, a lot identification, corresponding to a manufacturing lot and its originating production line MES. All production data for the manufacturing lot are stored in the originating production line MES, and is not duplicated by other MESs. Further, the central database stores a reservation of a different production line for the next process step, as relational data representative of the relationship between the lot ID and the different production line.

DETAILED DESCRIPTION

Figure 1:
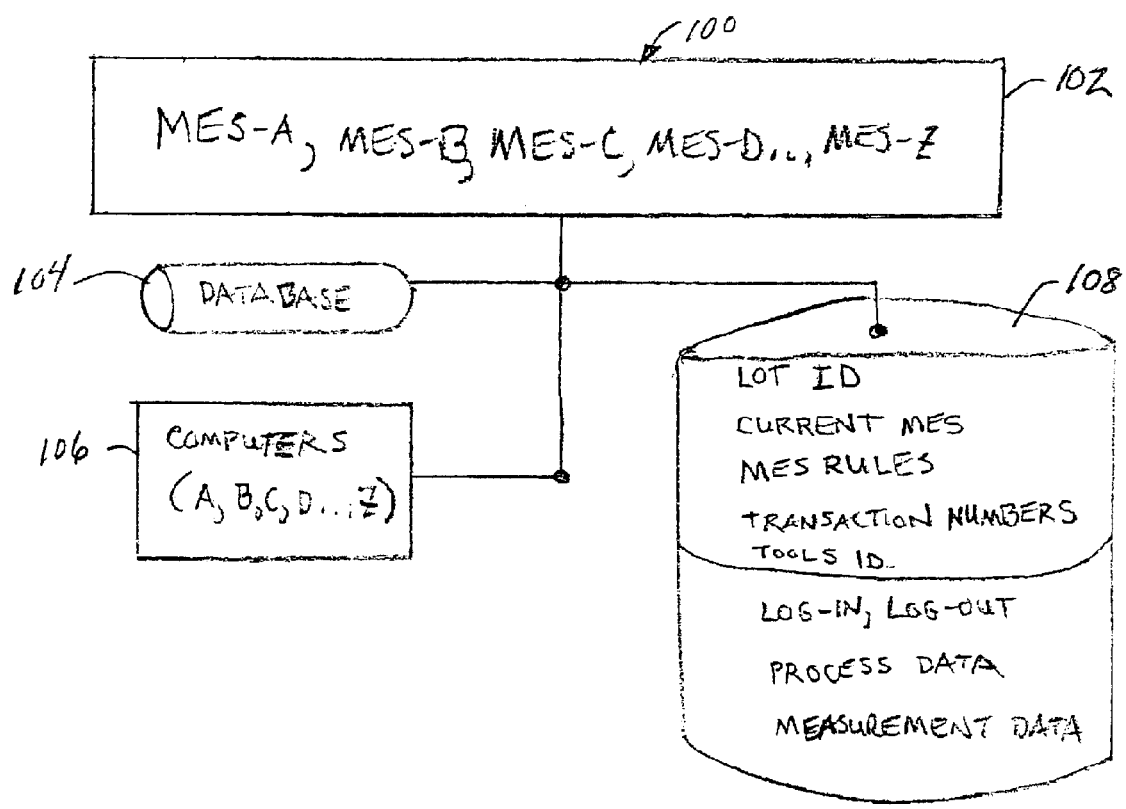
FIG. 1 is a diagram of a system for tool reserve and homogeneous MES.

The present invention is a method and system for the production data for a manufacturing lot that moves from a current production line to a different production line for the next process step. The manufacturing lot is identified by a lot ID. FIG. 1 discloses a system (100) of the invention. A MES computer network (102) stores all data corresponding to the MESs of all production lines, A, B, C, D . . . Z. The invention has a database (104) that is separate from the MESs, and communicates with the MESs and the network (102). Each production line has a computer (106) that communicates with the network (102), the MESs, and the database (104). Each computer (106) has a central processor, CPU, a keyboard and a mouse, as well as, a network connection to the network (102).

The database (104) records the lot ID corresponding to a manufacturing lot and its current production line and the current MES. A software program that generates the database automatically judges which MES the lot ID should be from, i.e., the current production line MES that is the sole MES that maintains all MES transactions for the lot ID. The database (104) records data that defines every transaction involving the lot ID. Further, the database (104) records data that identifies the tool IDs of different tools, or equipment available to perform the next process step in the manufacturing process of the lot ID. Those process steps are recorded by the database (104) as transactions performed by one or more different production lines on the same lot ID. A computer memory (108) stores the data recorded in the database (104).

When a lot ID is transferred to equipment of a different production line that has a different MES, that MES does not record the transaction data for the lot ID. Instead, the equipment data follows the rules of the current MES, according to the following process.

At run time, the current MES is contacted by a computer (106) to retrieve transaction set-up data associated with the lot ID. The transaction set-up data is stored in the computer memory (108), and includes, the lot ID, the current MES that is always associated with the lot ID, the current MES rules to follow, and the different transactions that are to be performed as required to manufacture the lot ID.

Each process step performed by the equipment is a transaction that corresponds to a transaction number. During run time, each process step records equipment transaction data that complies with the current MES rules to follow. The transaction information conforms to the rules of the current production line MES, and includes the transaction information: (1) a track-in and track-out log of the transaction. for the lot ID, (2) the process data required by the current MES rules of the transaction performed, and (3) the measurement data of the lot ID. Thereby, the rules of the current production line MES will have been satisfied, even though the transaction is performed by a different production line MES. Data storage space is saved by not requiring duplicate process data and measurement data to be kept by different MESs.

All production data for the same lot ID are stored in the current production line MES, and is not duplicated by other MESs. That reduces the time to search for MES history of the lot ID, as well as, reduces the time to locate the lot ID on a large factory floor.

Further, the database (104) stores a reservation of equipment of a different production line for performing the next process step. This procedure avoids back-up of idle manufacturing lots waiting for production. The reservation is made by relational data representative of the relationship between the lot ID and the different production line being reserved.

Figure 2:
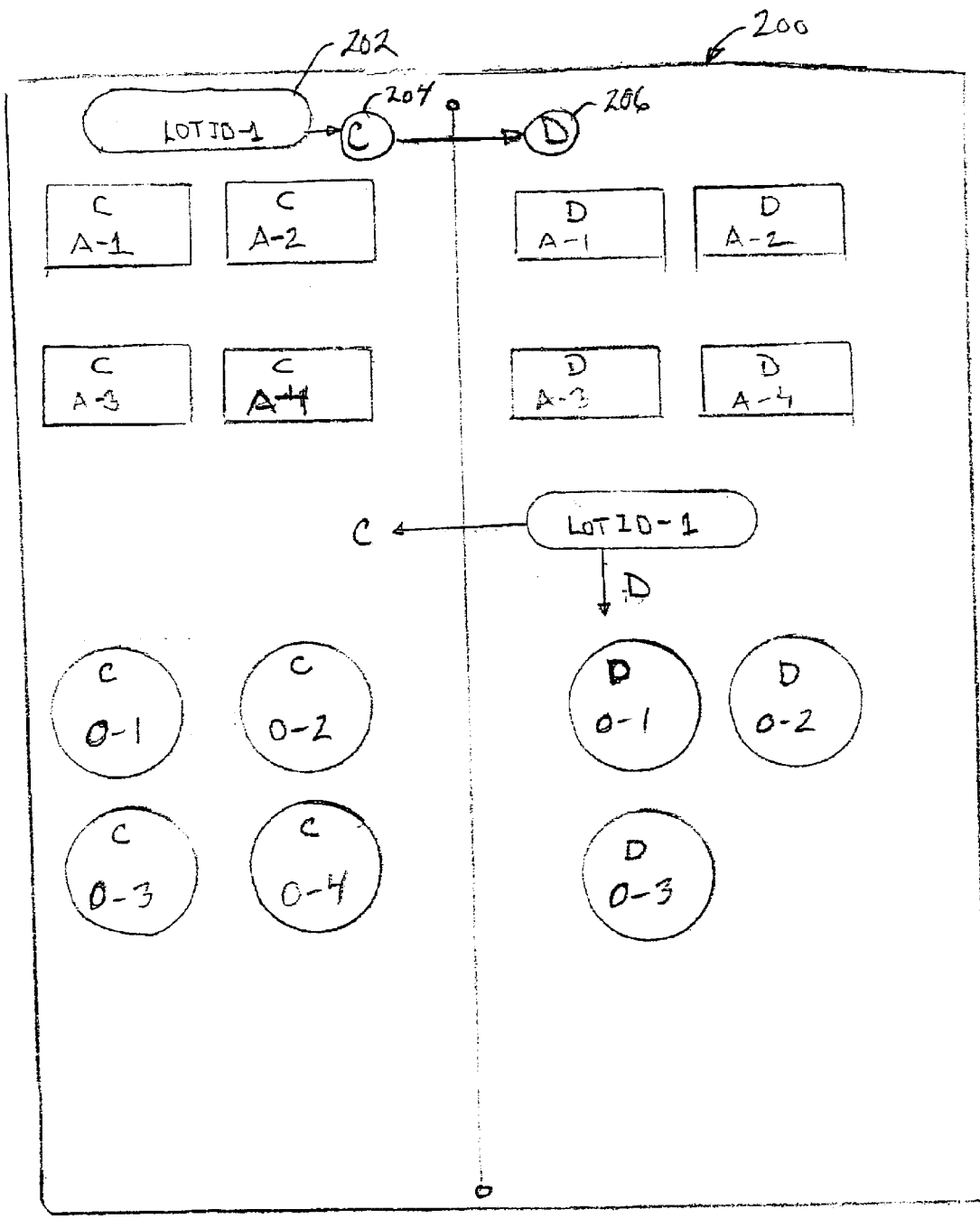
FIG. 2 is a diagrammatic view of equipment for tool reserve and homogeneous MES.

FIG. 2 discloses a tool reserve system (200), which discloses a procedure to reserve a tool for the next process step, process two. FIG. 2 discloses a manufacturing lot, LOT ID 1 (202), a production line C (204) and a production line D.(206). Production line C (204) has four equipments, C A-1, C A-2, C A-3 and C A-4, each of which can perform the next process step, process two, for a manufacturing lot identified by Lot ID-1 (202). Production line D (206) has four tools or equipments, D A-1, D A-2, D A-3 and D A-4, each of which can perform the next process step for Lot ID-1 (202).

Lot ID 1 (202) is associated with a current production line C (204) having the current MES-C. A technician responsible for production line C (204) recognizes on the computer (106) for production line C (204) that Lot ID-1 (202) will soon be ready for the next process step.

Further, the computer (106) indicates eight tools, or equipments, that perform the next process step. As disclosed by FIG. 2, four tools C-A-1, C-A-2, C-A-3 and C-A-4 are of the same production line C, and four tools D-A-1, D-A-2, D-A-3 and D-A-4 A-4 are of production line D. A check of the capacity utilization of the two production lines determines whether to move the Lot ID-1 from the current production line C (204) to a backup production line D (206).

After the technician for production line C (204) notifies and confirms with the technician for production line D (206), the computer (106) is used to reserve lot to a selected tool in production line D. The database (104) records the reservation status. When the manufacturing lot, for example, Lot ID-1, is moved from the current production line, for example production line C (204), to another production line, for example, production line D (206), for the next process step, a lot backup from C to D has occurred. The lot, Lot ID-1, is referred to as a backup lot.

Via the tool reserve recorded by the computer (106), the OMI of the supporting production line D (206) will show the status of each backup lot reserved by the C production line (204).

After the Lot ID-1 has been processed by the reserved backup tool of production line D (206), the backup lot will, by default, be sent to the next tool in the backup production line D (206) for the next process step, as recorded by the computer (106). The computer (106) immediately notifies the technician for production line C (204) that the Lot ID-1 has been processed, and that the next step is reserved by default for one of the tools D-O-1, D-O-2 and D-O-3 of the default production line D (206).

The technician of the current production line C (104) then checks the capacity utilization of the tools for the next process step. The computer (106) identifies the default production line D (206) has three tools, and the production line C (204) has four tools, C-O-1, C-O-2, and C-O-3 capable of performing the next process step. After checking the capacity utilization of the tools in both production lines, the technician has an opportunity to allow the default reserve to continue or to reserve a particular tool of the production line C (204). One or more of the process steps can be combined and/or performed in different sequential order, as being obvious modifications of the process disclosed by FIG. 2.

Although the invention has been described in terms of exemplary embodiments, it is not limited thereto. Rather, the appended claims should be construed broadly, to include other variants and modifications of the invention, which may be made by those skilled in the art without departing from the scope and range of equivalents of the invention.

What is claimed is:

1. A system for an integrated manufacturing execution system, MES, that unifies the production data for a manufacturing lot that moves from a current production line to different production lines, comprising:

a database recording data pertaining to, a manufacturing lot ID identifying the manufacturing lot, a current MES associated with the lot ID, MES rules and transactions performed to manufacture the manufacturing lot identified by the lot ID;

a memory storing data recorded in the database;

a computer of the current production line, the computer communicating with the database and with production line MESs of each of the different production lines to which the manufacturing lot identified by the lot ID is moved to perform the transactions;

the database supplying the different production lines with MES rules of the current production line; and the database recording transaction data, for each transaction performed on the manufacturing lot, in the current MES, whereby the current MES unifies the production data for the manufacturing lot.

2. The system as in claim 1 wherein, the database records transaction data from each of the different production lines, the transaction data corresponding to the MES rules of the current MES.

3. The system as in claim 1 wherein, the database records transaction data from each of the different production lines, the transaction data including; track-in, track-out data, and processing data and measurement data, which correspond to the MES rules of the current MES.

4. The system as in claim 1, and further comprising:

a production computer of each of the different production lines supplying the transaction data to the database.

5. The system as in claim 1, and further comprising:

the database recording a tool reserve to move the lot ID to a reserved tool of a different production line for performing a next process step.

6. A method for unifying manufacturing capacity utilization with a unified MES, comprising the steps of:

checking capacity utilization status of multiple tools for performing the next process step on a manufacturing lot;

reserving one of the tools to perform a next process step;

transferring the manufacturing lot from a current production line to a backup production line having the reserved one of the tools; and performing the next process step in the backup production line, and collecting process data and measurement data, which correspond to the MES rules of the current production line.

7. The method as in claim 6, further comprising the step of:

storing the process data and manufacturing data of the manufacturing lot in the current production line MES.

8. The method as in claim 6, further comprising the step of:

defaulting the manufacturing lot to the next tool in the backup production line for the next process step.

9. The method as in claim 6, further comprising the steps of:

defaulting the manufacturing lot to the next tool in the backup production line for the next process step;

checking the capacity utilization of all tools to perform the next process step; and reserving a selected one of the tools in a different backup production line to perform the next process step.

10. The method as in claim 6, further comprising the steps of:

defaulting the manufacturing lot to the next tool in the backup production line for the next process step;

checking the capacity utilization of all tools to perform the next process step; and reserving the tool of the current production line to perform the next process step.

* * * * *